(12) United States Patent
BenHanokh et al.

(10) Patent No.: US 11,397,678 B2
(45) Date of Patent: Jul. 26, 2022

(54) POOLING DISTRIBUTED STORAGE NODES THAT HAVE BACKUP POWER SUPPLIES AND WRITE-BACK CACHING CAPABILITIES

(71) Applicant: RED HAT, INC., Raleigh, NC (US)

(72) Inventors: Gabriel Zvi BenHanokh, Tel-Aviv (IL); Joshua Durgin, Canyon Country, CA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/074,977

(22) Filed: Oct. 20, 2020

(65) Prior Publication Data

US 2022/0121572 A1 Apr. 21, 2022

(51) Int. Cl.
*G06F 12/0804* (2016.01)
*G06F 1/30* (2006.01)

(52) U.S. Cl.
CPC .......... *G06F 12/0804* (2013.01); *G06F 1/30* (2013.01); *G06F 2212/60* (2013.01)

(58) Field of Classification Search
CPC ..... G06F 12/0804; G06F 1/30; G06F 2212/60
See application file for complete search history.

(56) References Cited

U.S. PATENT DOCUMENTS

| | | | |
|---|---|---|---|
| 5,898,880 A * | 4/1999 | Ryu | G06F 1/3268 713/323 |
| 6,438,647 B1 * | 8/2002 | Nielson | G06F 11/2092 711/113 |
| 10,565,108 B2 | 2/2020 | Sreedhar et al. | |
| 10,592,416 B2 | 3/2020 | Baddepudi et al. | |
| 10,620,875 B2 | 4/2020 | Vasudevan | |
| 2006/0010300 A1 * | 1/2006 | Arakawa | G06F 11/2074 711/162 |
| 2011/0197036 A1 * | 8/2011 | Ishii | G06F 12/0866 711/155 |

(Continued)

FOREIGN PATENT DOCUMENTS

WO 2016/076850 A1 5/2016

OTHER PUBLICATIONS

"Enabling HDD Write-Back Cache on Intel® Modular Server Systems," Intel Corporation, 2017, https://www.intel.com/content/www/us/en/support/articles/000008121/server-products/server-systems.html.

(Continued)

*Primary Examiner* — Michael Krofcheck
(74) *Attorney, Agent, or Firm* — Kilpatrick Townsend & Stockton LLP

(57) ABSTRACT

Distributed storage nodes having backup power supplies and write-back caching capabilities can be pooled for servicing write requests. For example, a management node of a distributed storage system can determine a subset of storage nodes, from among a group of storage nodes of the distributed storage system, coupled to backup power supplies based on status information received from the group of storage nodes. The status information can indicate whether a respective storage node of the group of storage nodes is coupled to a corresponding backup power supply. The management node can then generate a node pool that includes the subset of storage nodes with write-back caching enabled. The node pool can be configured to perform write-back caching in relation to a write request.

20 Claims, 6 Drawing Sheets

(56) References Cited

U.S. PATENT DOCUMENTS

2016/0283336 A1* 9/2016 Petersen .................. G06F 1/30
2017/0031831 A1* 2/2017 Boh .................... G06F 12/0871
2017/0160779 A1* 6/2017 Park ..................... G06F 1/3287

OTHER PUBLICATIONS

"Veritas InfoScale™ 7.4 SmartIO for Solid State Drives Solutions Guide—Linux," May 30, 2018, https://www.veritas.com/support/en_US/doc/133108971-133108974-0/br74_v83990510-133108974.
"ServeRAID Write-Cache Modes for Logical Drives," IBM, Jan. 28, 2019, https://www.IBM.com/support/pages/serveraid-write-cache-modes-logical-drives.

* cited by examiner

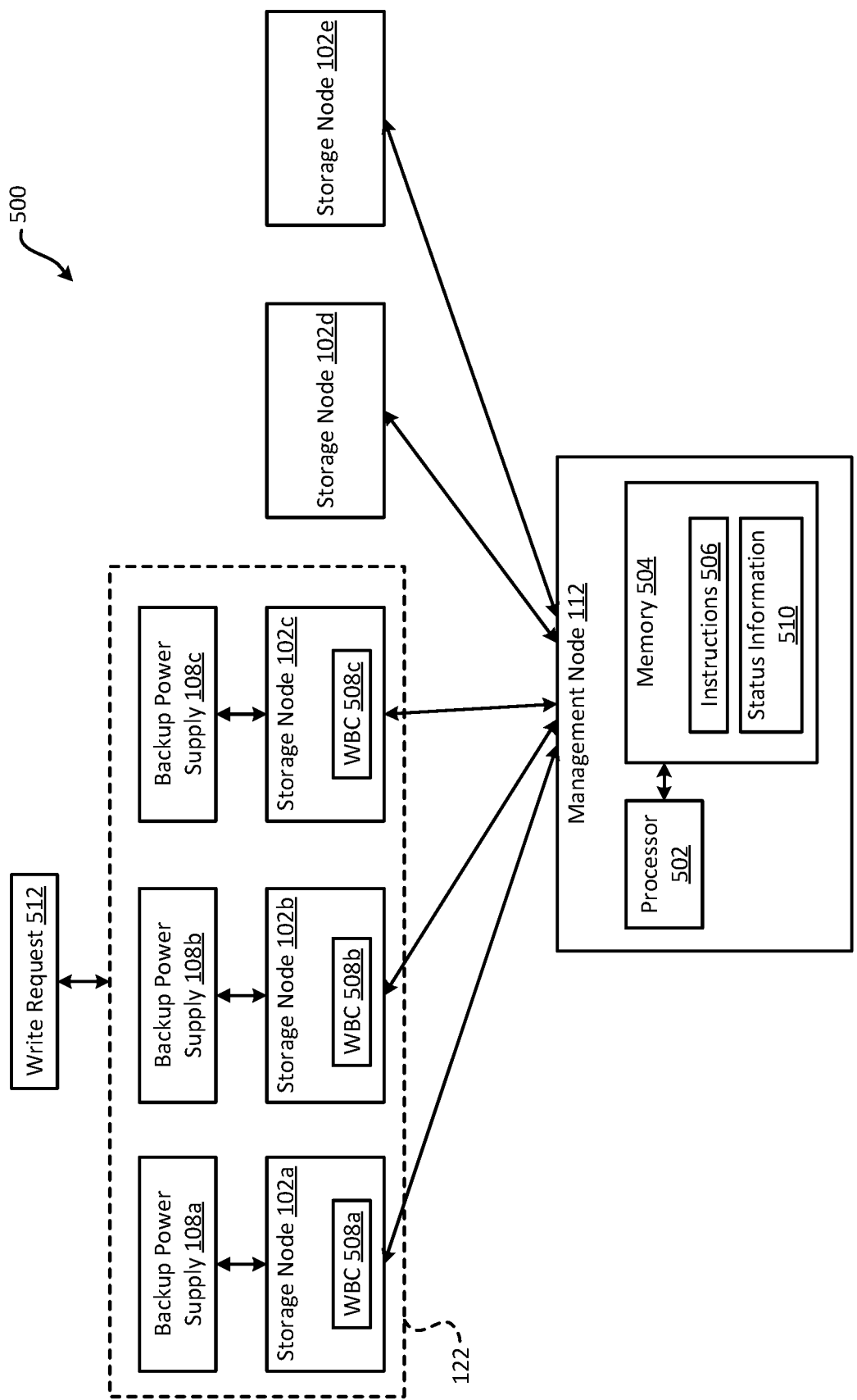

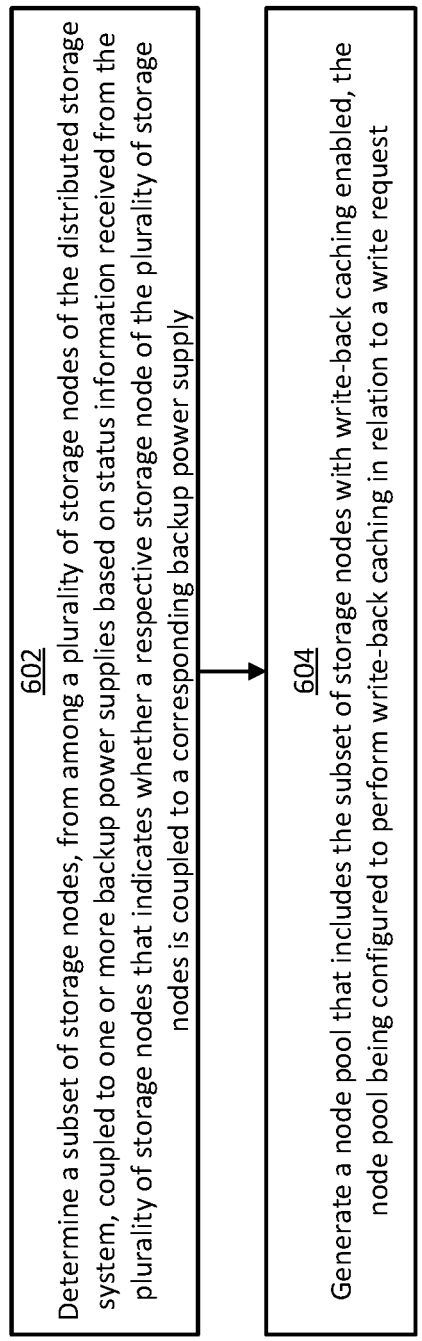

POOLING DISTRIBUTED STORAGE NODES THAT HAVE BACKUP POWER SUPPLIES AND WRITE-BACK CACHING CAPABILITIES

TECHNICAL FIELD

The present disclosure relates generally to distributed storage systems. More specifically, but not by way of limitation, this disclosure relates to pooling storage nodes of a distributed storage system that have backup power supplies and write-back caching capabilities for servicing write requests.

BACKGROUND

Distributed storage systems can include storage nodes (e.g., physical servers) in communication with each other over a network for synchronizing, coordinating, and storing data. The storage nodes can work together so that the distributed storage system behaves as one storage system. Distributed storage systems can implement block storage, file storage, or object storage techniques.

There are numerous advantages to using distributed storage systems, such as improved scalability, redundancy, and performance. In particular, distributed storage systems can be easily scaled horizontally, in the sense that they can combine many storage nodes into a single, shared storage system. Distributed storage systems can also store many copies of the same data for high availability, backup, and disaster recovery purposes. Additionally, some distributed storage systems can execute compute workloads on the same storage nodes that are also used to store data, thereby yielding a hyper-converged infrastructure (HCI) that is highly efficient.

BRIEF DESCRIPTION OF THE DRAWINGS

FIG. 5 is a block diagram of another example of a distributed storage system according to some aspects of the present disclosure.

FIG. 6 a flow chart of an example of a process for pooling distributed storage nodes according to some aspects of the present disclosure.

DETAILED DESCRIPTION

Figure 1:
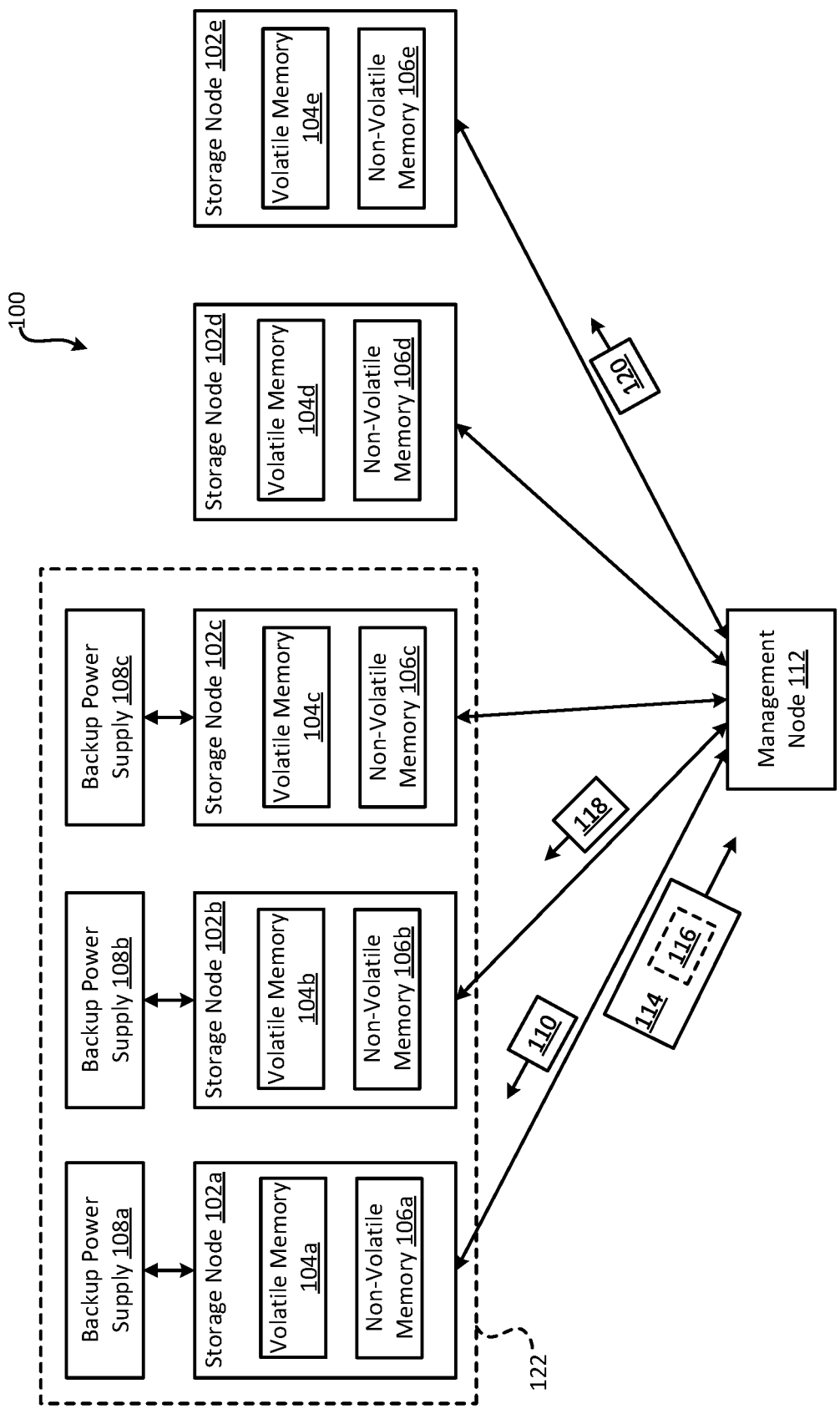
FIG. 1 is a block diagram of an example of a distributed storage system according to some aspects of the present disclosure.

A distributed storage system can include storage nodes formed from relatively heterogeneous servers in communication with each other over a network, such as a local area network. Some of the storage nodes may have backup power supplies that can provide emergency power to the storage nodes if a primary source of power is lost. Other storage nodes may lack backup power supplies. In such situations, the distributed storage system may operate as if all of the storage nodes lack backup power supplies, since distributed storage systems generally operate on the basis of the lowest common denominator. As a result, the distributed storage system may not have certain functionality that relies on the storage nodes having backup power supplies, even though such functionality could improve the performance of the distributed storage system.

One example of such functionality is write-back caching. Write-back caching can involve a system receiving a write request to store data and responsively storing the data in cache memory, without writing the data to disk. The system can maintain the data in the cache memory until an event occurs that makes writing to disk desirable, at which point the system can then write the data to disk. Write-back caching can significantly improve the performance of a storage system because write-back caching allows for data-write aggregation in cache memory and minimizes disk writes, which are relatively slow. But given the volatile nature of cache memory, write-back caching is generally implemented on storage systems that have backup power supplies to prevent cached data from being inadvertently erased due to power loss. As a result, write-back caching is not typically enabled on distributed storage systems, since it is possible for a set of write requests to be distributed among some storage nodes that have backup power supplies and other storage nodes that lack backup power supplies. In fact, if even one storage node in a distributed storage system lacks a backup power supply, the distributed storage system may disable write-back caching across all storage nodes (including those with backup power supplies) to prevent data loss. Of course, this prevents the distributed storage system from obtaining the performance benefits associated with write-back caching.

Some examples of the present disclosure can overcome one or more of the abovementioned problems by identifying storage nodes in a distributed storage system that have backup power supplies, enabling write-back caching on the storage nodes, grouping the storage nodes together into a pool of storage nodes ("node pool") that have write-back caching enabled, and using the node pool to perform write-back caching in relation to a set of write requests. This can prevent the write requests from being divided up among some storage nodes that have backup power supplies and other storage nodes that lack backup power supplies, so that the write requests are assigned only to storage nodes that have backup power supplies. With the write requests assigned only to storage nodes having backup power supplies, write-back caching can be performed in relation to the write requests while minimizing the likelihood of data loss.

One particular example can involve a distributed storage system, such as Ceph Storage by Red Hat®. The distributed storage system can include hundreds or thousands of storage nodes. Each storage node can determine if it has a backup power supply, such as an uninterruptible power supply (UPS). A storage node can "have" a backup power supply if the storage node is electrically coupled to the backup power supply such that the storage node can receive electrical power from the backup power supply. Each storage node can determine if it has a backup power supply by scanning its hardware. For example, a storage node can analyze its hardware upon booting up to determine if a backup power supply is connected. As another example, a storage node may periodically analyze its hardware at predefined intervals to determine if a backup power supply is connected. As yet another example, a storage node may analyze its hardware in response to an event determine if a backup power supply is connected. The storage nodes, after scanning their hardware, can then transmit status communications indicating whether or not they have backup power supplies.

A centralized management node of the distributed storage system can receive the status communications from the storage nodes. Based on the status communications, the management node can determine a subset of the storage nodes that have backup power supplies. The management node may then transmit communications to the subset of storage nodes for causing the storage nodes to enable write-back caching functionality. Alternatively, the storage nodes may automatically enable write-back caching functionality upon discovering that they are connected to backup power supplies. Either way, write-back caching functionality can be enabled on the storage nodes.

Next, the management node can assign the storage nodes in the subset to the same node pool. As a result, the node pool may only contain storage nodes with backup power supplies and write-back caching enabled. The node pool can then be used to service a set of write requests, so that write-back caching can be performed in relation to the write requests with little fear of data loss. Such node pools may be considered higher-tiered pools with better performance, given their backup power supplies and write-back caching capabilities. Thus, a service provider that is selling access to the distributed storage system may charge higher fees for using the node pool than for other node pools, such as node pools that lack backup power supplies or write-back caching capabilities.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a distributed storage system 100 according to some aspects of the present disclosure. The distributed storage system 100 includes storage nodes 102*a-e*. The storage nodes 102*a-e* may be physical servers for storing data. The storage nodes 102*a-e* may include volatile memories 104*a-e*, non-volatile memories 106*a-e*, or both of these. Examples of non-volatile memory can be a cache memory or random access memory (RAM). Examples of non-volatile memory can include a hard disk (HD) or a solid state drive (SSD).

Some storage nodes 102*a-c* can have backup power supplies 108*a-c*, while other storage nodes 102*d-e* may lack backup power supplies. Examples of the backup power supplies 108*a-c* can include an uninterruptable power supply (UPS) or another battery backup system. The backup power supplies can 108*a-c* can be internal or external (and electrically coupled) to the storage nodes 102*a-c*. Each of the storage nodes 102*a-c* may have its own backup power supply or the storage nodes 102*a-c* can share backup power supplies.

In some examples, the storage nodes 102*a-e* can each analyze their hardware to determine if they have a corresponding backup power supply. For example, storage nodes 102*a-c* may analyze their hardware and determine that backup power supplies 108*a-c* are attached. And storage nodes 102*d-e* may analyze their hardware and determine that they lack backup power supplies. The storage nodes 102*a-e* may analyze their hardware to determine if they have a backup power supply in response to any suitable event. For example, the storage nodes 102*a-e* may each analyze their hardware to detect the presence of a backup power supply in response to a boot up event. As another example, the storage nodes 102*a-e* may each analyze their hardware to detect the presence of a backup power supply in response to the passage of a predefined amount of time, such as one hour. As yet another example, the storage nodes 102*a-e* may each analyze their hardware to detect the presence of a backup power supply in response to a request 110 from a management node 112 of the distributed storage system 100. One example of such a request 110 is shown in FIG. 1, but the management node 112 can transmit similar types of requests to many or all of the storage nodes 102*a-e*.

After analyzing their hardware to detect backup power supplies, the storage nodes 102*a-e* can generate respective status information indicating whether or not they have the backup power supplies. Each of the storage nodes 102*a-e* can then transmit a status communication that includes the respective status information over a network (e.g., a local area network or the Internet) to the management node 112. One example of a status communication 114 with status information 116 is shown in FIG. 1, but many or all of the storage nodes 102*a-e* may transmit similar types of status communications to the management node 112.

The management node 112 is configured to manage one or more aspects of the distributed storage system 100. For example, the management node 112 can generate node pools and manage which virtual storage units are mapped to which nodes. The management node 112 may also manage which storage nodes 102*a-e* have write-back caching enabled or disabled, as described below.

In some examples, the management node 112 can receive the status communications from the storage nodes 102*a-e* and determine a subset of storage nodes 102*a-c* that are coupled to backup power supplies 108*a-c* based on the status information in the status communications. Write-back caching can then be enabled on the subset of storage nodes 102*a-c*. For example, the management node 112 can transmit signals, such as signal 118, to the subset of storage nodes 102*a-c* for causing the storage nodes 102*a-c* to enable write-back caching. Each signal can include a command or other information configured to cause a corresponding storage node to enable write-back caching. For instance, the storage nodes 102*a-c* may be in a first state in which write-back caching is disabled. To enable write-back caching on the storage nodes 102*a-c*, the management node 112 can transmit signals with activation commands to the storage nodes 102*a-c*. The storage nodes 102*a-c* can receive the signals, detect the activation commands in the signals, and responsively switch from the first state to a second state in which write-back caching is enabled. In other examples, at least some of the storage nodes 102*a-c* may automatically enable write-back caching in response to determining that they have backup power supplies 108*a-c*. In still other examples, a system administrator may manually enable write-back caching on at least some of the storage nodes 102*a-c* based on determining that the storage nodes 102*a-c* have backup power supplies 108*a-c*. By using one or more of the above techniques, write-back caching can be enabled on the storage nodes 102*a-c*.

Write-back caching can involve storing data in a volatile memory for a period of time before writing the data to non-volatile memory. As one particular example, a storage node 102*a* can receive a write request for writing data to memory. In response to the write request, the storage node 102*a* may only write the data to volatile memory 104*a*. That is, the storage node 102*a* may not write the data to the non-volatile memory 106*a* yet. At a later point in time, the storage node 102*a* can detect an event. An example of the event can include the storage node 102*a* entering an idle state. In response to detecting the event, the storage node 102a can then proceed to write the data to the non-volatile memory 106a. For example, the storage node 102a can obtain the data from the volatile memory 104a, write the data to the non-volatile memory 106a, and erase the data from the volatile memory 104a. By maintaining the data in the volatile memory 104a for a time period before writing the data to non-volatile memory 104a, the storage node 102 can perform various data operations (e.g., data writes) on the data in the volatile memory 104a during that time period, which can be significantly faster than performing the same data operations in non-volatile memory 106a.

In some examples, the management node 112 can also determine storage nodes 102d-e that are not coupled to backup power supplies. The management node 112 may then transmit signals, such as signal 120, to the storage nodes 102d-e that lack backup power supplies for causing the storage nodes 102d-e to disable write-back caching. Each signal can include a command or other information configured to cause a corresponding storage node to disable the write-back caching functionality. For example, the storage nodes 102d-e may be in a second state in which write-back caching is enabled. To disable write-back caching on the storage nodes 102d-e, the management node 112 can transmit signals with deactivation commands to the storage nodes 102d-e. The storage nodes 102d-e can receive the signals, detect the deactivation commands in the signals, and responsively switch from the second state to a first state in which write-back caching is disabled.

With the write-back caching functionality engaged on the subset of storage nodes 102a-c, the management node 112 can assign the subset of storage nodes 102a-c to a node pool 122. A node pool can be a defined group of storage nodes configured to implement storage functionality to service one or more read/write requests. In this example, the node pool 122 only includes the storage nodes 102a-c that have backup power supplies 108a-c. The node pool 122 may be designated as a higher-tiered pool, since it may have better performance characteristics than another node pool (e.g., a node pool that includes storage nodes 102d-e) that lacks backup power supplies or write-back caching capabilities.

A user can obtain access to the node pool 122 for storing data. For example, a user may purchase a monthly subscription to the node pool 122, allowing the user to store data thereon by submitting a predefined number of write requests. Upon the user being granted such access, the distributed storage system 100 can cause the node pool 122 to perform write-back caching in relation to the write requests submitted by the user. The write-back caching may yield better performance than is otherwise achievable using other storage techniques, such as write-through caching.

It will be appreciated that FIG. 1 is intended to be illustrative and non-limiting. Other examples may include more components, fewer components, different components, or a different arrangement of the components shown in FIG. 1. For instance, although the distributed storage system 100 includes five storage nodes in the example of FIG. 1, the distributed storage system 100 may have hundreds or thousands of storage nodes in other examples.

Figure 2:
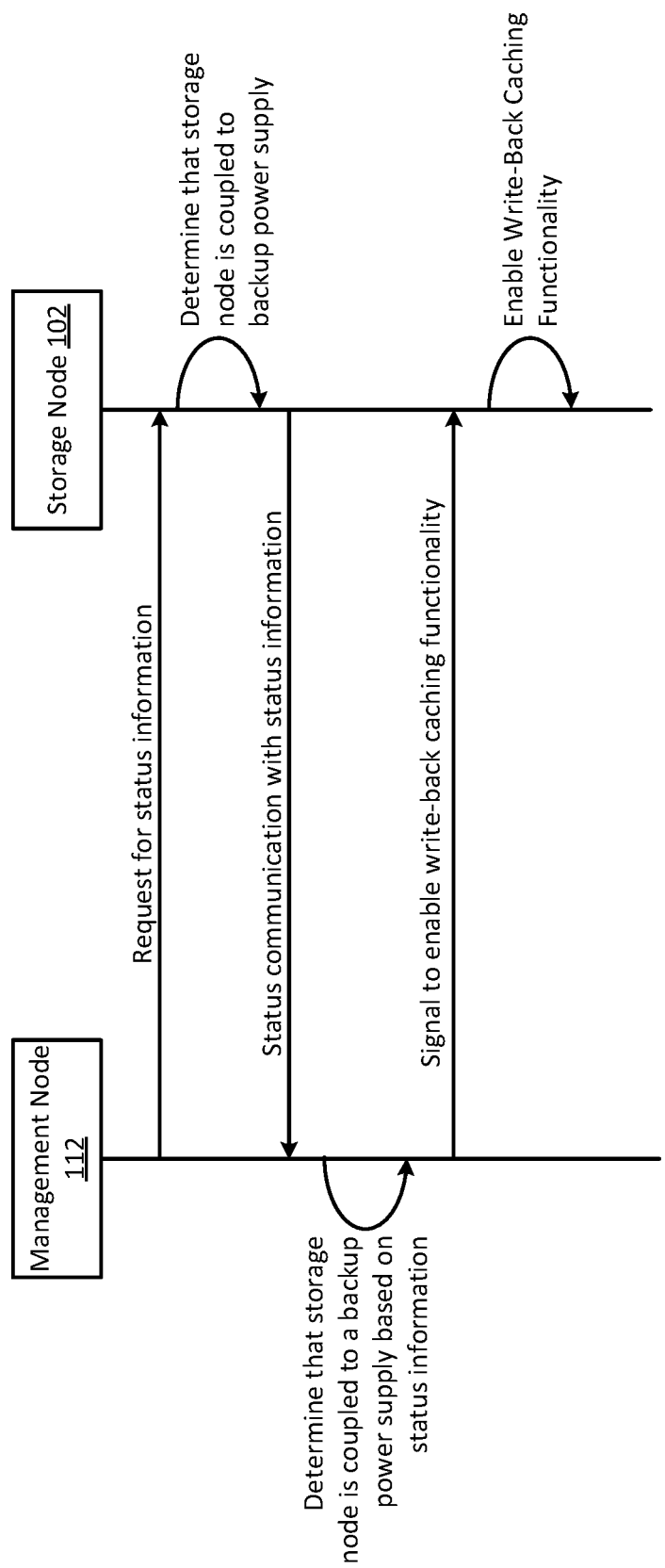
FIG. 2 is a sequence diagram of an example of a process for enabling write-back caching on a storage node according to some aspects of the present disclosure.

FIG. 2 is a sequence diagram of an example of a process for enabling write-back caching on distributed storage nodes according to some aspects of the present disclosure. Although the example shown in FIG. 2 includes a certain sequence of steps, other examples may involve more steps, fewer steps, different steps, or a different order of the steps shown in FIG. 2.

The process begins with a management node 112 of a distributed storage system transmitting a request for status information to a storage node 102. The storage node 102 can receive the request and responsively determine if a backup power supply is coupled to the storage node. In this example, the storage node 102 has determined that a backup power supply is coupled to the storage node 102. Next, the storage node 102 can transmit a response to the request, where the response is in the form of a status communication with status information indicating that the storage node 102 is coupled to a backup power supply. The management node 112 can receive the status communication and determine that the storage node 102 is coupled to a backup power supply based on the status information. The management node 112 may then transmit a signal to the storage node 102 for causing the storage node 102 to enable write-back caching. The storage node 102 can receive the signal and responsively enable write-back caching.

In some examples, the distributed storage system can use the storage node 102 to service a write request. The write request may be a higher-priority write request for which backup power and write-back caching may be desirable. A write request may be higher-priority if it is more critical, demanding, or higher cost than other write requests. For example, a user may pay a premium for the user's write requests to be deemed higher priority.

Figure 3:
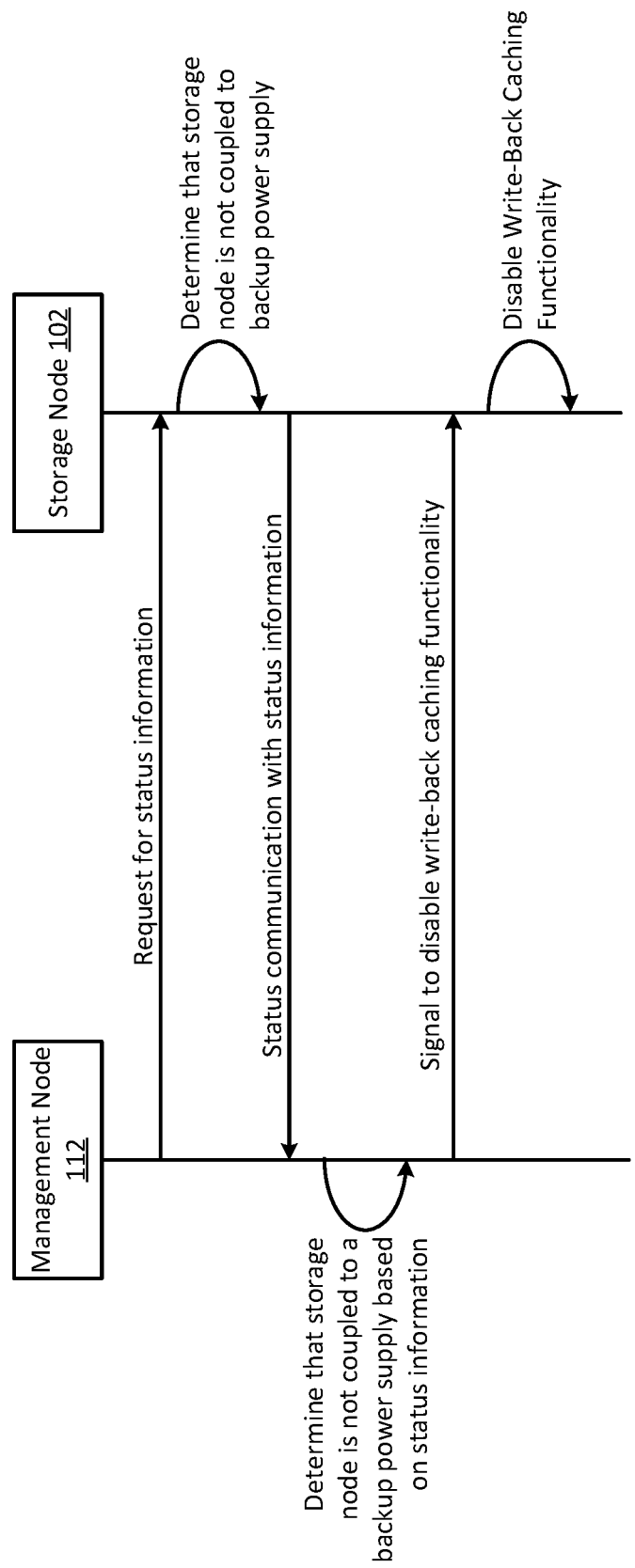
FIG. 3 is a sequence diagram of an example of a process for disabling write-back caching on a storage node according to some aspects of the present disclosure.

FIG. 3 is a sequence diagram of an example of a process for disabling write-back caching on distributed storage nodes according to some aspects of the present disclosure. Although the example shown in FIG. 3 includes a certain sequence of steps, other examples may involve more steps, fewer steps, different steps, or a different order of the steps shown in FIG. 3.

The process begins with a management node 112 of the distributed storage system transmitting a request for status information to a storage node 102. The storage node 102 can receive the request and responsively determine if a backup power supply is coupled to the storage node. In this example, the storage node 102 has determined that a backup power supply is not coupled to the storage node 102. Next, the storage node 102 can transmit a response to the request, where the response is in the form of a status communication with status information indicating that the storage node 102 is not coupled to a backup power supply. The management node 112 can receive the status communication and determine that the storage node 102 is not coupled to a backup power supply based on the status information. The management node 112 may then transmit a signal to the storage node 102 for causing the storage node 102 to disable write-back caching. The storage node 102 can receive the signal and responsively disable write-back caching, for example by switching from a second state in which write-back caching is enabled to a first state in which write-back caching is disabled.

Figure 4:
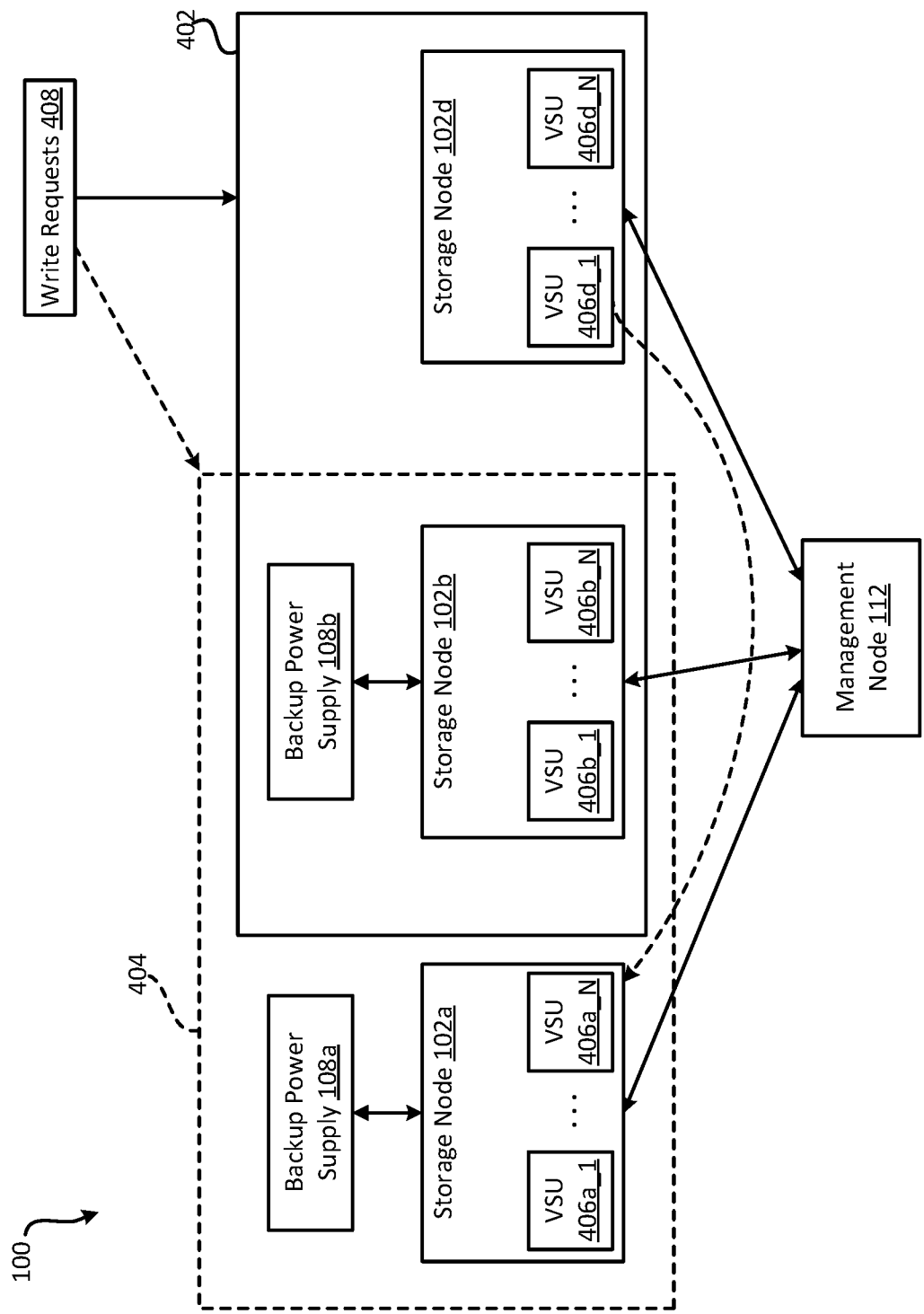
FIG. 4 is a block diagram of an example of data migration in a distributed storage system according to some aspects of the present disclosure.

FIG. 4 is a block diagram of an example of a migration process in a distributed storage system 100 according to some aspects of the present disclosure. In this example, the distributed storage system 100 includes a first node pool 402 for servicing write requests 408 from a client device, such as a laptop computer, desktop computer, server, or mobile device. The client device may be external to the distributed storage system 100. Within the first node pool 402 is a storage node 102d that lacks a backup power system. As a result, the storage node 102d may not have write-back caching capabilities enabled. The storage node 102d may include any number of virtual storage units (VSU) 406d. Virtual storage units can be logical devices that are mapped to physical storage devices for storing data associated with write requests. The node locations and physical storage-device mappings of the VSUs in the distributed storage system 100 may be adjustable by the management node 112.

It may be desirable for the data associated with the write requests 408 to be stored using storage nodes that have write-back caching enabled, given the performance improvements associated with write-back caching. For example, if the write requests 408 are higher priority, it may be desirable to store the data associated with the write requests 408 using higher-performance storage nodes that have write-back caching enabled. To that end, the management node 112 can generate a second node pool 404 (e.g., using the techniques described above) that includes storage nodes 102a-b on which write-back caching is enabled. Write-back caching may be enabled on the storage nodes 102a-b based on the storage nodes 102a-b having corresponding backup power supplies 108a-b. The management node 112 can then migrate a VSU 406d_1 that is a destination for the write requests 408 from storage node 102d to storage node 102a. This migration is represented in FIG. 1 by a dashed arrow. The management node 112 can also transmit a communication to the client device from which the write requests 408 originated, to notify the client device of the change in location of the VSU 406d_1. As a result, the client device can direct future write requests 408 destined for VSU 406d_1 to storage node 102a, so that the write requests 408 can be serviced by the second node pool 404 using write-back caching.

As one particular example, the management node 112 can determine that the write requests 408 have a particular priority level, such as a high priority level in which it may be important to prevent data loss or in which higher storage-system performance is desirable. Different write requests 408 may have different priority levels assigned by a user or the system. The management node 112 can also determine a VSU 406d_1 associated with the write requests 408 is located on a particular storage node 102d of the distributed storage system 100. The management node 112 can communicate with the particular storage node 102d to determine that the particular storage node 102d lacks a backup power supply. For example, the management node 112 can receive status information from the particular storage node 102d indicating that the particular storage node 102d lacks a backup power supply. Since the particular storage node 102d lacks a backup power supply, write-back caching is likely disabled on that storage node. Based on determining that (i) the write requests 408 have the particular priority level and (ii) the particular storage node 102d having the VSU 406d_1 associated with the write requests 408 does not have the backup power supply, the management node 112 can migrate the VSU 406d_1 from the particular storage node 102d to another storage node 102a that has an associated backup power supply 108a. The other storage node 102a may also have write-back caching enabled. As a result, the write requests 408 can be safely serviced by the other storage node 102a (e.g., using write-back caching) moving forward, given the presence of a backup power supply 108a.

It will be appreciated that FIG. 4 is intended to be illustrative and non-limiting. Other examples may include more components, fewer components, different components, or a different arrangement of the components shown in FIG. 4. For instance, although the distributed storage system 100 includes three storage nodes in two node pools in the example of FIG. 4, the distributed storage system 100 may have any number of storage nodes spread across any number of node pools.

FIG. 5 is a block diagram of another example of a distributed storage system 500 according to some aspects of the present disclosure. The distributed storage system 500 includes a management node 112, storage nodes 102a-e, and backup power supplies 108a-c coupled to some of the storage nodes 102a-c.

In this example, the management node 112 includes a processor 502 communicatively coupled with a memory 504. The processor 502 can include one processor or multiple processors. Non-limiting examples of the processor 502 include a Field-Programmable Gate Array (FPGA), an application-specific integrated circuit (ASIC), a microprocessor, etc. The processor 502 can execute instructions 506 stored in the memory 504 to perform operations. The instructions 506 can include processor-specific instructions generated by a compiler or an interpreter from code written in any suitable computer-programming language, such as C, C++, C#, etc.

The memory 504 can include one memory or multiple memories. Non-limiting examples of the memory 504 can include electrically erasable and programmable read-only memory (EEPROM), flash memory, or any other type of non-volatile memory. At least some of the memory 504 includes a non-transitory computer-readable medium from which the processor 502 can read the instructions 506. The non-transitory computer-readable medium can include electronic, optical, magnetic, or other storage devices capable of providing the processor 502 with computer-readable instructions or other program code. Examples of the non-transitory computer-readable medium can include magnetic disks, memory chips, ROM, random-access memory (RAM), an ASIC, optical storage, or any other medium from which a computer processor can read the instructions 506.

In some examples, the processor 502 of the management node 112 can execute the instructions 506 to perform operations. For example, the processor 502 can receive status information 510 from a plurality of storage nodes 102a-e of the distributed storage system 500. The status information 510 can indicate whether each storage node in the plurality of storage nodes 102a-e is coupled to a corresponding backup power supply. For example, the status information 510 can indicate that storage nodes 102a-c are coupled to one or more backup power supplies (e.g., backup power supplies 108a-c), and that storage nodes 102d-e are not coupled to backup power supplies. Based on the status information 510, the processor 502 can determine a subset of storage nodes 102a-c, from among the plurality of storage nodes 102a-e, coupled to one or more backup power supplies. Based on identifying the subset of storage nodes 102a-c, the processor 502 can then generate a node pool 122 that includes the subset of storage nodes 102a-c. Write-back caching ("WBC") 508a-c can be enabled on the subset of storage nodes 102a-c. The node pool 122 can be configured to perform the write-back caching 508a-c in relation to a write request 512.

In some examples, the processor 502 can implement some or all of the steps shown in FIG. 6. Other examples can include more steps, fewer steps, different steps, or a different order of the steps than is shown in FIG. 6. The steps of FIG. 6 are discussed below with reference to the components discussed above in relation to FIG. 5.

In block 602, a processor 502 determines a subset of storage nodes 102a-c, from among a plurality of storage nodes 102a-e of a distributed storage system 100, coupled to one or more backup power supplies 108a-c. The processor 502 can determine the subset of storage nodes 102a-c based on status information 510 received from the plurality of storage nodes. The status information 510 can indicate whether a respective storage node of the plurality of storage nodes 102a-e is coupled to a corresponding backup power supply. In some examples, the status information 510 can indicate whether each storage node in the plurality of storage nodes 102a-e is coupled to a corresponding backup power supply.

In block 604, the processor 502 generates a node pool 122 that includes the subset of storage nodes 102a-c with write-back caching 508a-c enabled. In some examples, generating the node pool 122 may involve transmitting one or more commands to an application programming interface (API) of the distributed storage system 100 for causing the distributed storage system 100 to assign the storage nodes into the node pool 122. The node pool 122 can be configured to perform write-back caching in relation to a write request 512. For example, the write request 512 can correspond to a particular VSU in the node pool 122. As a result, the write request 512 can be serviced by the node pool 122 using write-back caching.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A management node of a distributed storage system, the management node comprising:
   a processor; and
   a memory including instructions that are executable by the processor for causing the processor to:
      determine a subset of storage nodes, from among a plurality of storage nodes of the distributed storage system, coupled to one or more backup power supplies based on status information received from the plurality of storage nodes that indicates whether a respective storage node of the plurality of storage nodes is coupled to a corresponding backup power supply, wherein the management node is separate from the plurality of storage nodes; and
      generate a node pool that includes the subset of storage nodes with write-back caching enabled, the node pool being configured to perform write-back caching in relation to a write request.

2. The management node of claim 1, wherein each storage node in the plurality of storage nodes is configured to determine whether the storage node is coupled to a backup power supply and responsively transmit a status communication to the management node, the status communication including respective status information indicating whether the storage node is coupled to the backup power supply.

3. The management node of claim 1, wherein the node pool consists only of storage nodes in the subset having the one or more backup power supplies.

4. The management node of claim 1, wherein the memory further includes instructions that are executable by the processor for causing the processor to transmit signals to the subset of storage nodes for causing each storage node in the subset of storage nodes to enable write-back caching.

5. The management node of claim 4, wherein the signals are configured to cause each storage node in the subset of storage nodes to switch from a first state in which write-back caching is disabled to a second state in which write-back caching is enabled.

6. The management node of claim 1, wherein the memory further includes instructions that are executable by the processor for causing the processor to:
   determine, based on the status information, that a storage node of the plurality of storage nodes is not coupled to a backup power supply; and
   transmit a signal to the storage node for causing the storage node to disable write-back caching.

7. The management node of claim 1, wherein the memory further includes instructions that are executable by the processor for causing the processor to:
   determine that a particular write request has a particular priority level;
   determine that a particular virtual storage unit (VSU) associated with the particular write request is located on a particular storage node of the distributed storage system;
   determine, based on the status information, that the particular storage node does not have a backup power supply; and
   based on determining that the particular write request has the particular priority level and that the particular storage node does not have the backup power supply, migrate the particular VSU from the particular storage node to another storage node of the distributed storage system that has an associated backup power supply.

8. The management node of claim 1, wherein the memory further includes instructions that are executable by the processor for causing the processor to:
   select the subset of storage nodes for inclusion in the node pool based on determining that the subset of storage nodes are coupled to the one or more backup power supplies; and
   based on selecting the subset of storage nodes for inclusion in the node pool, generate the node pool to include the subset of storage nodes.

9. A method comprising:
   determining, by a processor of a management node, a subset of storage nodes, from among a plurality of storage nodes of a distributed storage system, coupled to one or more backup power supplies based on status information received from the plurality of storage nodes that indicates whether a respective storage node of the plurality of storage nodes is coupled to a corresponding backup power supply, wherein the management node is separate from the plurality of storage nodes; and
   generating, by the processor, a node pool that includes the subset of storage nodes with write-back caching enabled, the node pool being configured to perform write-back caching in relation to a write request.

10. The method of claim 9, wherein each storage node in the plurality of storage nodes is configured to determine whether the storage node is coupled to a backup power supply and responsively transmit a status communication including respective status information indicating whether the storage node is coupled to the backup power supply.

11. The method of claim 9, wherein the node pool consists only of the storage nodes in the subset having the one or more backup power supplies.

12. The method of claim 9, further comprising transmitting signals to the subset of storage nodes for causing each storage node in the subset of storage nodes to enable write-back caching.

13. The method of claim 12, wherein each storage node in the subset of storage nodes is configured to receive one of the signals and responsively switch from a first state in which write-back caching is disabled to a second state in which write-back caching is enabled.

14. The method of claim 9, further comprising:
determining, based on the status information, that a storage node of the plurality of storage nodes is not coupled to a backup power supply; and
transmitting a signal to the storage node for causing the storage node to disable write-back caching.

15. The method of claim 9, further comprising:
determining that a particular write request has a particular priority level;
determining a particular virtual storage unit (VSU) associated with the particular write request is stored on a particular storage node of the distributed storage system;
determining, on the status information, that the particular storage node does not have a backup power supply; and
based on determining that the particular write request has the particular priority level and that the particular storage node does not have the backup power supply, migrating the particular VSU from the particular storage node to another storage node of the distributed storage system that has an associated backup power supply.

16. A non-transitory computer-readable medium comprising program code that is executable by a processor for causing the processor to:
determine a subset of storage nodes, from among a plurality of storage nodes of a distributed storage system, coupled to one or more backup power supplies based on status information received from the plurality of storage nodes that indicates whether a respective storage node of the plurality of storage nodes is coupled to a corresponding backup power supply, wherein the processor is separate from the plurality of storage nodes; and
generate a node pool that includes the subset of storage nodes with write-back caching enabled, the node pool being configured to perform write-back caching in relation to a write request.

17. The non-transitory computer-readable medium of claim 16, wherein each storage node in the plurality of storage nodes is configured to determine whether the storage node is coupled to a backup power supply and responsively transmit a status communication to the processor, the status communication including respective status information indicating whether the storage node is coupled to the backup power supply.

18. The non-transitory computer-readable medium of claim 16, further comprising program code that is executable by the processor for causing the processor to transmit signals to the subset of storage nodes for causing each storage node in the subset of storage nodes to enable write-back caching.

19. The non-transitory computer-readable medium of claim 16, further comprising program code that is executable by the processor for causing the processor to:
determine, based on the status information, that a storage node of the plurality of storage nodes is not coupled to a backup power supply; and
transmit a signal to the storage node for causing the storage node to disable write-back caching.

20. The non-transitory computer-readable medium of claim 16, further comprising program code that is executable by the processor for causing the processor to:
determine that a particular write request has a particular priority level;
determine a particular virtual storage unit (VSU) associated with the particular write request is stored on a particular storage node of the distributed storage system;
determine, based on the status information, that the particular storage node does not have a backup power supply; and
based on determining that the particular write request has the particular priority level and that the particular storage node does not have the backup power supply, migrate the particular VSU from the particular storage node to another storage node of the distributed storage system that has an associated backup power supply.

* * * * *